March 12, 1963 C. VAN DER LELY 3,080,699
IMPLEMENTS FOR LATERALLY DISPLACING CROP LYING ON THE GROUND
Filed March 17, 1960 3 Sheets-Sheet 3

INVENTOR.
Cornelis van der Lely
BY
Mason, Mason & Albright

United States Patent Office 3,080,699
Patented Mar. 12, 1963

3,080,699
IMPLEMENTS FOR LATERALLY DISPLACING CROP LYING ON THE GROUND
Cornelis van der Lely, 7 Bruschrain, Zug, Switzerland
Filed Mar. 17, 1960, Ser. No. 15,668
Claims priority, application Netherlands Apr. 4, 1959
2 Claims. (Cl. 56—377)

This invention relates to an implement for laterally displacing crop lying on the ground, of the kind comprising a frame adapted to be connected to a tractor or the like for moving the implement over the ground, said frame carrying at least two groups of rake wheels and being such that the part thereof which carries the rake wheels can be inverted with respect to the part which is adapted to be connected to the tractor or the like, the arrangement permitting the implement to be brought from one working position to another by inverting the said frame part which carries the rake wheels.

In accordance with the invention there is provided an implement of the kind set forth, wherein the rake wheels of a group are mounted upon a supporting member which extends from the rear side of a leading rake wheel of the group to the front side of the next oncoming rake wheel of the group.

Herein, such terms as "front," "rear," "leading" and "oncoming" are used in reference to the intended direction of travel of the implement.

Figure 1:
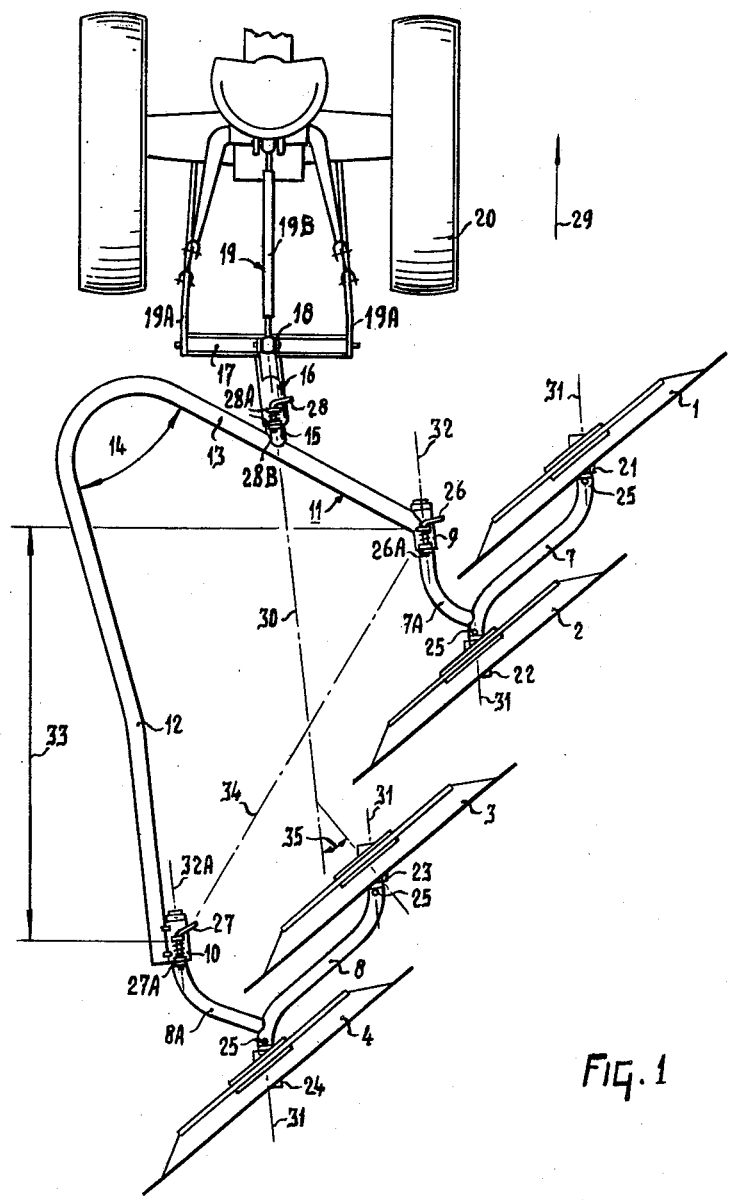
Figure 2:
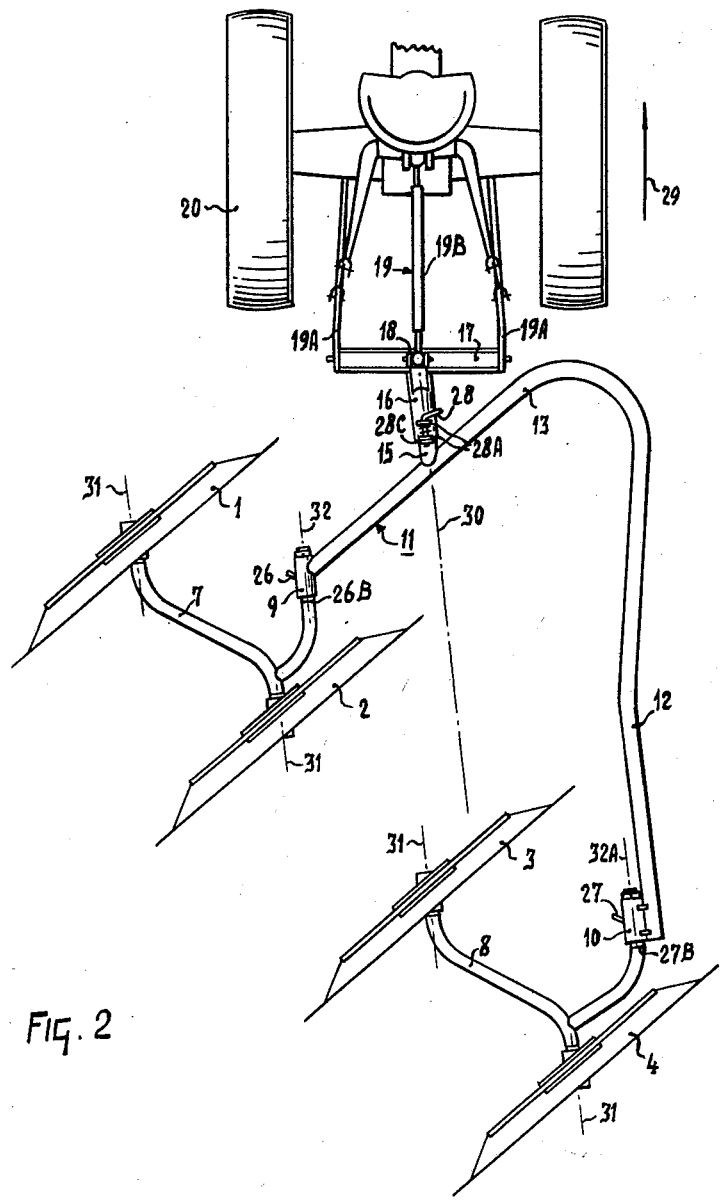

For a better understanding of the invention and to show how the same may be carried into effect, reference will now be made by way of example to the accompanying drawings in which:

FIGURE 1 is a plan view of an implement made in accordance with the invention and in a working position where it will operate as a side delivery rake, FIGURE 2 is a plan view of the implement shown in FIGURE 1 but in a working position where it will operate as a tedder, and FIGURE 3 is again a plan view of the implement shown in FIGURE 1, but in a working position where it will operate as a swath turner.

Referring first to FIGURE 1, the implement is shown mounted upon a tractor 20. The tractor 20 has a three-point power hoist 19 possessing the usual pair of lower links 19A and an upper link 19B. The implement has a coupler means for attachment to the ends of the links of the power hoist, such coupler comprising a horizontal bar 17 which is adapted to be connected between the lower links 19A and a vertical post 18, the upper end of which is adapted to be connected to the upper link 19B, whilst the lower end is fixedly secured at about the centre of the bar 17. A short tubular frame member 16 is at one end fixed to the coupler 17, 18, the other end of such frame member having a pair of lugs 28A fixed thereon. A locking pin 28 is entered in aligned holes formed in the lugs 28A, the locking pin being spring-loaded so as to tend always to have one end of the locking pin protruding beyond the end of the frame member 16. A stub-shaft 15 is entered in the hollow of the tubular frame member 16 and carries two diametrically opposed lugs 28B and 28C. Only the lug 28B can be seen in FIGURE 1, but the other lug 28C which is angularly displaced 180° therefrom, can be seen in FIGURES 2 and 3. Both the lugs 28B and 28C have a hole into which the protruding end of the locking pin 28 may be introduced according to whether the lug 28B or the lug 28C is in register with the pin. The stub-shaft 15 is mounted upon a main frame beam 11. The latter consists of portions 12 and 13, the portion 12 extending generally in the intended direction of travel of the implement, which direction is indicated by the arrow 29. The portion 13 lies transverse to the intended direction of travel so that these two portions are inclined to one another at an angle indicated at 14, such angle being about 50°.

The free end of the frame beam portion 13 carries fixedly a bearing sleeve 9 the axis of which is indicated at 32. A spring-loaded locking pin 26 is mounted upon the sleeve 9 in the same way as the locking pin 28 is mounted upon the frame member 16. The bearing sleeve 9 receives rotatably one end of a curved arm 7A which has a pair of diametrically opposed lugs 26A and 26B, each formed with a hole in which the pin 26 can be entered depending upon which lug is brought into register therewith. Only the lug 26A is seen in FIGURE 1 but the lug 26B can be seen in FIGURE 2. The free end of the other frame beam portion 12 likewise carries fixedly a bearing sleeve 10 having an axis 32A and provided with a spring-loaded locking pin 27 arranged in the same manner as the locking pin 26. One end of a curved arm 8A is rotatably received in the bearing sleeve 10, and this arm likewise has a pair of diametrically opposed lugs 27A and 27B. The lugs 27B can be seen in FIGURE 2. The arms 7A and 8A are held in the respective bearing sleeves 9 and 10 by retaining rings clearly shown in FIGURE 1.

The free end of the arm 7A is fixed near one end of a supporting member 7 which serves to support a group of rake wheels 1 and 2. The support 7 is at each end bent in opposite directions to form a pair of stub-shafts having parallel axes indicated at 31. Upon each of these stub-shafts there is mounted a sleeve 21, 22, the sleeves being adjustable upon their stub-shafts about their axes 31, and there being locking means 25 to hold the sleeves in desired positions of adjustment. Each sleeve has a bearing mounted thereon, to permit free rotation of the rake wheel 1 or 2 as the case may be. The axis of the bearing is inclined to the axis 31 so that by turning the sleeve on which a bearing is mounted, the obliquity of the associated rake wheel in relation to the direction of travel of the implement, can be altered.

The arm 8A is secured to a supporting member 8 which is the same as the member 7 and which likewise carries sleeves 23 and 24 turnable about axes 31 and lockable with the aid of locking means 25. The sleeves have inclined bearings mounted on them and carrying freely rotatable rake wheels 3 and 4 which form a second group of the same kind as the first group 1, 2.

When the implement is in the working position shown in FIGURE 1, the power hoist of the tractor can be adjusted so as to allow the rake wheels 1 to 4 to contact the ground. As the tractor is driven in the direction 29, the contact of the rake wheels with the ground and/or the crop lying thereon will cause the rake wheels to rotate because of their oblique setting in relation to the line of travel. The rake wheels 1 to 4 constitute a single row of rake wheels and it will be understood that crop in the path of the leading rake wheel 1 will be displaced laterally to the left into the path of the next oncoming rake wheel 2 and so on down the row until the crop is finally displaced to the left by the rake wheel 4. Hence the implement will act as a side delivery rake, delivering to the left.

The implement may be brought from the working position shown in FIGURE 1 to the working position shown in FIGURE 2 by first raising the implement from the ground with the aid of the tractor power hoist. Thereafter the locking pin 28 may be withdrawn against the action of its spring-loading, so that the pin no longer engages the lug 28B. The frame beam 11 can now be inverted by turning the frame beam through 180° about the axis of the frame member 16. Such axis is indicated at 30. This will bring the frame beam 11 to the position shown in FIGURE 2 and the locking pin 28 may now be engaged in the lug 28C to hold the frame beam in the new position. Next the locking devices associated with the sleeves of the rake wheel bearings are released so that the rake wheels 1 and 2 can be brought to a position of opposite obliquity, the sleeves being turned through 180°. The rake wheels 1 and 2 will thus have been brought to the position shown in FIGURE 2. In like manner the obliquity of the rake wheels 3 and 4 will be reversed by adjustment of their sleeves, so that these rake wheels also will be brought to the position shown in FIGURE 2. When the implement in the working position shown in FIGURE 2 is caused to travel over the ground in the direction indicated by the arrow 29, with the rake wheels in contact with the ground, the leading rake wheel 1 will displace crop to the left out of the path of the oncoming rake wheel 2. In like manner the rake wheel 2 will displace crop to the left out of the path of the rake wheel 3. Likewise the rake wheels 3 and 4 will independently displace a strip of crop. Hence all the rake wheels operate independently of one another and the implement will act as a tedder. It will be clear that the rake wheels can be brought to a position of opposite obliquity also by rotating about an axis which is inclined to the axis 31, e.g. a vertical axis.

Figure 3:
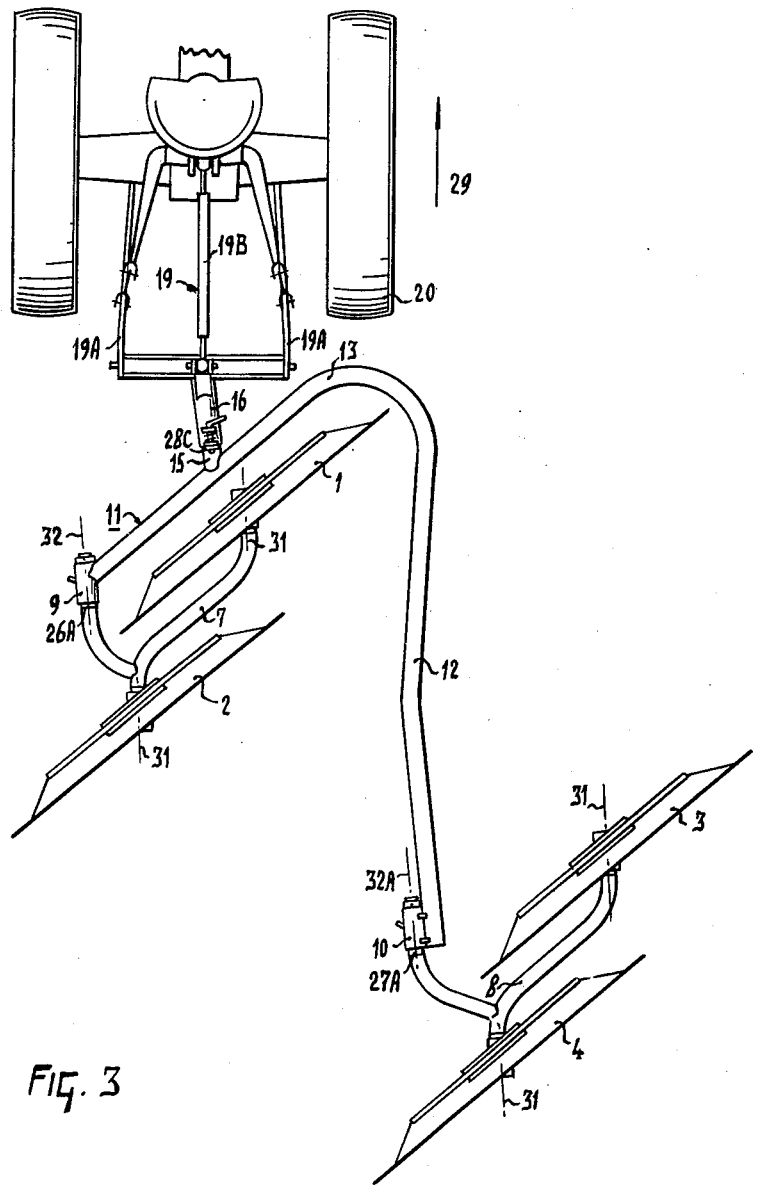

From the position shown in FIGURE 1, the implement may alternatively be brought to the working position shown in FIGURE 3, where it will act as a swath turner. To achieve the working position shown in FIGURE 3, the implement shown in FIGURE 1 is first adjusted so that the frame beam 11 is brought to the position previously described with reference to FIGURE 2. Thereafter the locking pins 26 and 27 are withdrawn from co-operation with the lugs 26A and 27A, and the arms 7A and 8A are swung through 180° about their respective axes 32 and 32A. The locking pins 26 and 27 are now entered in the lugs 26B and 27B respectively. With the implement in the position shown in FIGURE 3, when it is moved in the direction 29 with the rake wheels in contact with the ground, the rake wheel 1 with deliver crop to the left into the path of the rake wheel 2. The latter will engage the crop and also deliver it to the left, so that the rake wheels 1 and 2 will co-operate to turn a swath. The group of rake wheels 3 and 4 is disposed behind the group 1 and 2, but there is no co-operation between the groups. The rake wheel 3 delivers crop to the left into the path of the rake wheel 4 which further delivers the crop to the left. The group 3 and 4 operates upon another swath so that two swaths are simultaneously turned. As appears from FIGURE 1, there is a substantial distance, indicated at 33, between the bearing sleeves 9 and 10 as measured in the intended direction of travel of the implement. It is advantageous that the distance 33 is relatively great, since when the implement is brought to the position shown in FIGURE 3, during swath turning a swath passes along the front of the group of rake wheels 3, 4, and it is desirable that there should be considerable clearance between the two groups of rake wheels in order that the swath moved by the group 3, 4 should not undesirably contact the group of rake wheels 1, 2.

The working position shown in FIGURE 3 may be attained from the working position shown in FIGURE 2. Thus commencing with the position shown in FIGURE 2, the rake wheels may first have their obliquity reversed by turning the sleeves 180° about the axes 31. Thereafter the supporting members 7 and 8 are each swung 180° about their axes 32 and 32A, so that the position shown in FIGURE 3 is reached.

The frame of the implement described above is generally located in a plane which is substantially at the same level as the rotational axes of the rake wheels. When the implement is in the working position shown in FIGURE 3, it will be noted that the frame beam portion 13 lies in a front of the rake wheel 1 and is of length substantially equal to the overall diameter of the rake wheel 1. The frame beam portion 12 in this example is about 1.7 times the overall diameter of a rake wheel, and in all the working positions of the implement, this portion 12 extends substantially in the intended direction of travel of the implement. If a line 34 (see FIGURE 1) is drawn so as to interconnect the bearing sleeves 9 and 10, with such line 34 the portions 12 and 13 form a triangle, the longest side of which is constituted by the portion 12, the line 34 being in this example about 1.5 times the diameter of a rake wheel. It will be noted that the axes 30, 31, 32 and 32A are all parallel and extend substantially in the intended direction of travel of the implement. On the other hand, the axes of rotation of the rake wheels are inclined to the axes which have just been enumerated. In FIGURE 1 the axis of rotation of the rake wheel 3 is shown and it will be seen that this axis is inclined at an angle indicated at 35, to the axis 30. The angle 35 is about 35°, but in other constructional modifications this angle may lie between 20° and 70°.

It will be noted from a comparison of the figures, that when the rake wheels of a group are co-operating, as for example the group 1, 2 in either FIGURES 1 or 3, the supporting member 7 extends from behind the leading rake wheel of the group to the front of the next oncoming rake wheel of the group, the supporting member 7 lying substantially parallel to the planes of rotation of the rake wheels 1 and 2. When the rake wheels 1 and 2 are independently operating as in FIGURE 2, the supporting member 7 now lies substantially perpendicular to the planes of rotation of the rake wheels 1 and 2 and the distance between the rake wheels of the group, has been much increased. It is advantageous that the distance should be increased since the implement has to perform a tedding action. Finally it will be noted that the supporting structure for each group of rake wheels is constituted by a supporting member such as 7 combined with an arm such as 7A, the arm and supporting member being shaped like the divergent limbs of a Y or V. The provision of a Y- or V-supporting structure for each group of rake wheels facilitates the conversion of the implement from one working position to another.

What I claim is:

1. In a hay rake having a frame together with two groups of rake wheels interconnected with said frame and with each of said groups having a leading rake wheel and a trailing rake wheel, a supporting member connecting said frame and a group of said rake wheels, said supporting member mounting said leading rake wheel from the rake wheel's after side and mounting said trailing rake wheel from the rake wheel's forward side, said rake wheels being arranged in echelon for side delivery raking.

2. A convertible side delivery raking device for laterally displacing material lying on the ground comprising draft means having two parts, one of said parts being selectively rotatable relative to the other part, the first part of said draft means having coupling means for connecting the device with a tractor lift mechanism, a pair of rake wheels, a beam mounting the leading of said rake wheels from the rake wheel's after side and mounting the trailing rake wheel from the rake wheel's forward side, each rake wheel being operatively connected to said beam by means of a bearing about which the rake wheel is rotatable, whereby said beam may be rotated with respect to the first part of the draft means and said bearings may be rotated with respect to the frame beam to invert the device to form a tedder.

References Cited in the file of this patent

FOREIGN PATENTS 547,790 Belgium _____ May 31, 1956
564,291 Italy _____ June 13, 1957